(12) United States Patent
Varin

(10) Patent No.: US 6,759,621 B2
(45) Date of Patent: Jul. 6, 2004

(54) CYLINDRICAL HOLE AND FORM CENTERING AND DRILLING DEVICE

(75) Inventor: Jean-Jacques Florentin André Varin, Pontoise (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/466,557

(22) PCT Filed: Jan. 31, 2002

(86) PCT No.: PCT/FR02/00368
§ 371 (c)(1),
(2), (4) Date: Jul. 25, 2003

(87) PCT Pub. No.: WO02/060631
PCT Pub. Date: Aug. 8, 2002

(65) Prior Publication Data
US 2004/0074876 A1 Apr. 22, 2004

(30) Foreign Application Priority Data
Feb. 1, 2001 (FR) .......................................... 01 01350

(51) Int. Cl.⁷ .......................... B23H 9/10; B23H 1/04; B23H 7/26; B23H 9/14
(52) U.S. Cl. .................................. 219/69.15; 219/69.2
(58) Field of Search ............................ 219/69.15, 69.17, 219/69.2; 205/665

(56) References Cited

U.S. PATENT DOCUMENTS

| | | | | |
|---|---|---|---|---|
| 3,981,786 A | * | 9/1976 | Andrews | 204/224 M |
| 4,188,522 A | * | 2/1980 | Baker | 219/69.17 |
| 4,650,949 A | * | 3/1987 | Field | 219/69.15 |
| 4,782,203 A | * | 11/1988 | Check et al. | 219/69.15 |
| 4,922,076 A | * | 5/1990 | Cross et al. | 219/69.15 |
| 5,605,639 A | * | 2/1997 | Banks et al. | 219/69.17 |

FOREIGN PATENT DOCUMENTS

FR    2767083 A1 * 2/1999 ............ B23H/9/10

\* cited by examiner

Primary Examiner—Geoffrey S. Evans
(74) Attorney, Agent, or Firm—Bacon & Thomas, PLLC

(57) ABSTRACT

A device for electrical discharge machining at least one rectilinear cooling air passage having a flared opening in the wall of a hollow turbine vane. The device includes at least one forming electrode attached to a first electrode holder and includes a first face provided with a groove for guiding a rectilinear electrode configured to drill the rectilinear part of the air passage, a median portion with a constant section, and a pointed end portion with a section that decreases between the median portion and the point of the forming electrode.

11 Claims, 3 Drawing Sheets

CYLINDRICAL HOLE AND FORM CENTERING AND DRILLING DEVICE

BACKGROUND OF THE INVENTION

The present invention relates to an electrical discharge apparatus for machining at least one rectilinear cooling air duct having a flared exhaust orifice in the wall of a hollow blade of a gas turbine engine. The apparatus includes at least one electrode having a given geometry and mounted on a first electrode support arranged to machine the flared exhaust orifice, and means for driving the motion of the electrode support. The electrode comprises a rear end segment that is affixed to the first electrode support.

The output of aircraft gas turbines increases continuously. Illustratively, engine thrust increases with the temperature at an intake position of an engine turbine.

Raising this temperature, however, is limited by the heat resistance of the turbine's guide vanes and rotors since the strength of their material decreases as the temperature rises.

It is known to cool the outer blade wall with cooling air that is tapped into the compressors' zone and circulates in inner cavities defined in the blades that is evacuated through ducts fitted into the outer walls of the blades. The exhaust orifices of the ducts are widened and flared in order for the cooling air to constitute a cooling film that flows along the blade wall.

It is known to machine these air ducts by electrical discharge. However, one electrode is simultaneously used to manufacture the duct's flared orifice and the duct itself. As a result, the electrode geometry is complex and machining an electrode is difficult.

Moreover, one air duct is made at a time, and as a result, the electrode must be adjusted relative to the blade between each machining operation, entailing a substantial increase in manufacturing time.

SUMMARY OF THE INVENTION

The objective of the present invention is to provide tooling that reduces the costs of machining air ducts by using a set of interchangeable electrodes of simple geometries.

The present invention attains its goal by providing a forming electrode that comprises a first side fitted with a groove for guiding a straight electrode that machines a straight portion of the air duct, and furthermore, a middle segment of constant cross-section and a pointed front end segment of which the cross-section decreases from the middle segment to the tip of the forming electrode.

Advantageously the front end segment, in addition to the first side, also comprises three beveled facets.

The facets may slope at different angles, thereby making it possible to define a particular geometry for any kind of flared orifice.

Preferably, the cross-section of the middle segment of the forming electrode is quadrangular. In fact, the forming electrode is advantageously made from a cross-sectionally rectangular bar and the groove has a V-shaped cross-section.

The forming electrode is merely made of a cross-sectionally quadrangular bar into which is fitted a longitudinal groove, for instance of V-shaped cross-section, the end of the electrode tapering to constitute a tip element.

Advantageously, the apparatus of the invention also comprises a second electrode support supporting at least one straight electrode made to slide in the groove.

By providing the apparatus of the invention with two electrodes, easily machined electrodes may be used. Also, adjusting the straight electrode relative to the forming electrode makes it possible to define different geometries for the ducts to be machined. Again, in the event of wear, the defective electrode may be replaced while retaining the other.

Preferably, the straight electrode is cylindrical. As a result, if the second electrode is worn, it may be easily replaced.

Preferably, the apparatus of the invention also includes a plate to keep the cylindrical electrode in the groove.

In general, the electrodes are long relative to their cross-section and accordingly they become more susceptible to breaking the farther the electrode support is from the machining site. The plate acts as a cover, which together with the electrode's V-shape, defines a housing for the cylindrical electrode, the latter thereby being guided when in the vicinity of the zone where the air ducts are being machined.

Preferably, the apparatus of the present invention is fitted with means simultaneously moving the first and the second electrode supports.

The two electrode supports are displaced jointly, the cylindrical electrode positioned to the rear of the forming electrode in order to first machine the flared orifice of the air duct.

Preferably, the apparatus of the invention also is fitted with means to displace the first electrode support and the second electrode support independently of each other.

The moment the air duct's flared orifice has been completed, the cylindrical electrode continues its motion until the cylindrical duct has been completed. In this manner, the stresses applied to the electrodes during machining are spread out better.

Preferably, the first electrode support holds a plurality of forming electrodes and the second electrode support holds a plurality of straight electrodes.

Because the electrodes may be adjusted mutually during one and the same operational stage, a set of air ducts can be machined simultaneously, preferably in one and the same blade.

Other features and advantages of the present invention are elucidated in the illustrative and non-limiting description below and in relation to the attached drawings.

DETAILED DESCRIPTION OF THE INVENTION

The control systems driving the various electrodes are known and therefore not shown. In the present invention, each electrode may be fitted with its own independent drive system.

Figure 1:
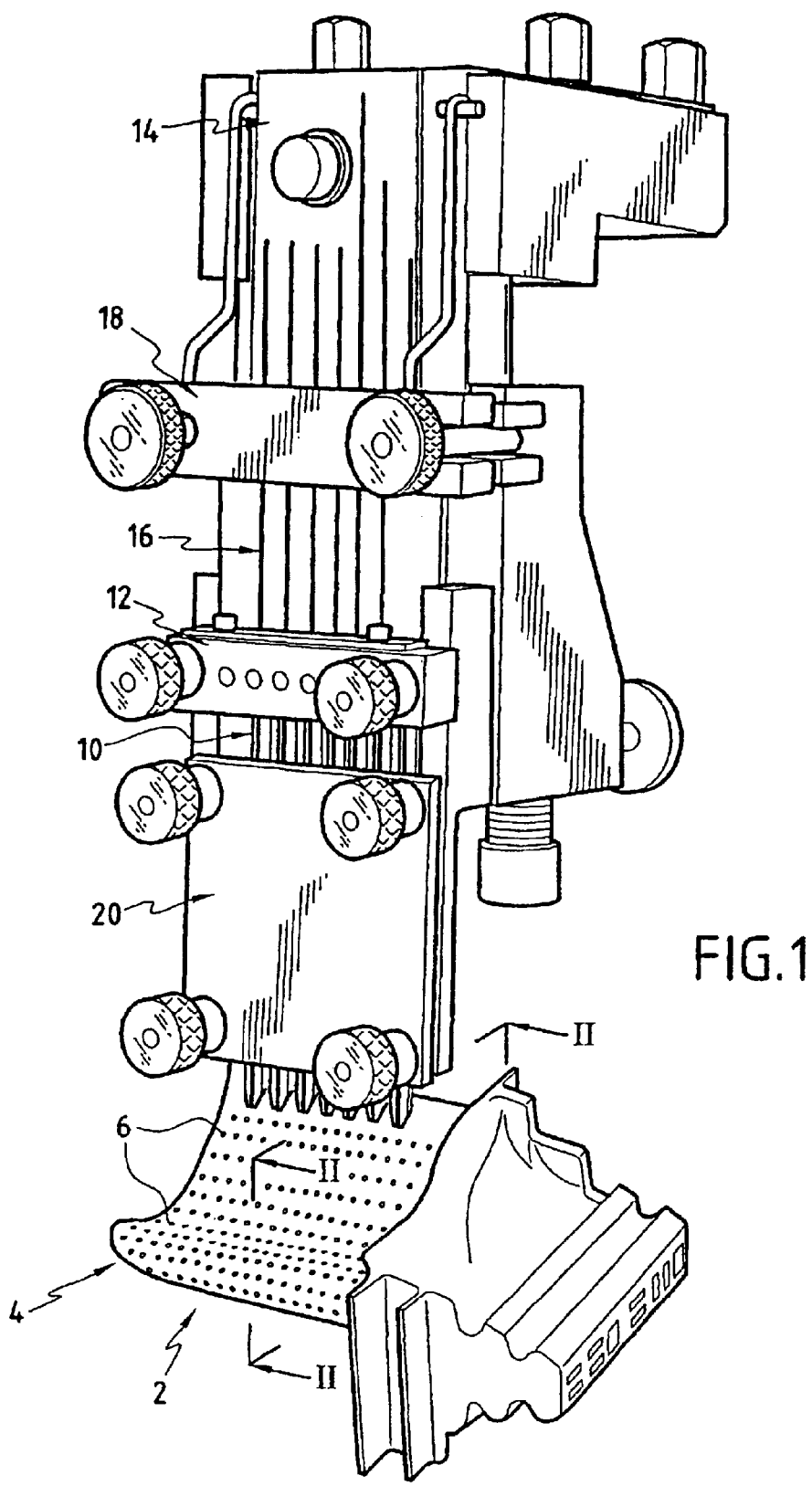
FIG. 1 is a perspective of the electrical discharge apparatus of the invention.

FIG. 1 shows the electrical discharge apparatus of the present invention, as a whole, including a hollow blade 2 of a gas turbine engine that is mounted on a support (not shown). This blade 2 comprises an outer wall 4 into which are fitted air ducts 6.

Figure 2:
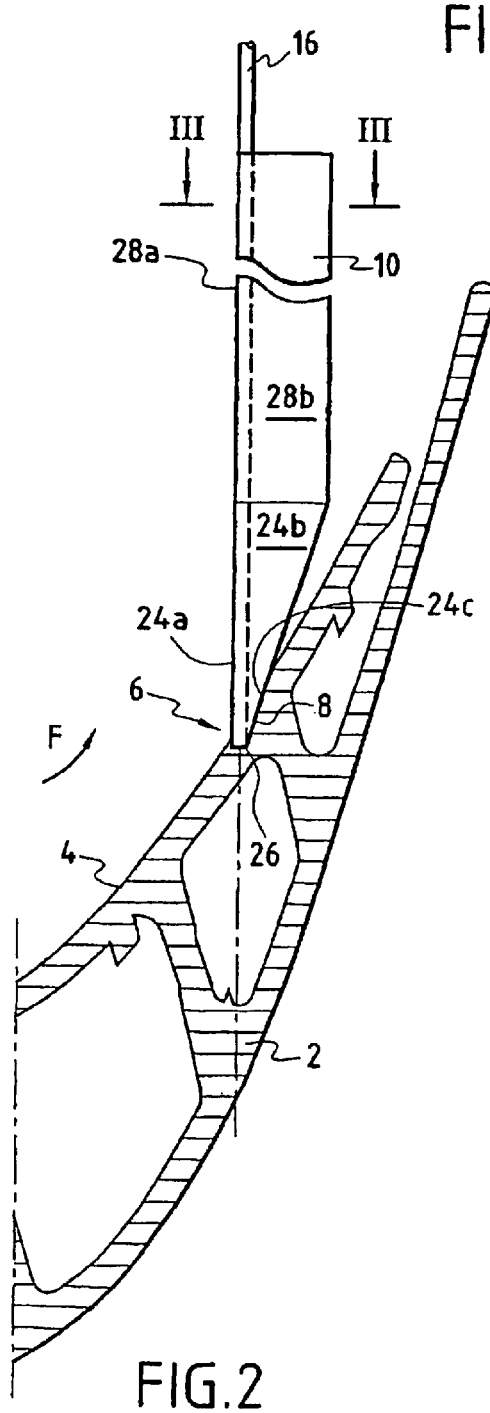
FIG. 2 is a sectional view of a gas turbine engine's hollow blade when the flared orifice of a cooling-air duct is being machined.

FIG. 2 shows that these air ducts 6 each comprise an exhaust orifice 8 that flares downstream in the direction of the flow of combustion gases denoted by F, and a rectilinear segment 7. The various air ducts 6 are made by electrical discharge using a set of electrodes of two types.

The first type of electrode is a forming electrode 10 arranged to form the flared shape of the exhaust orifice. The forming electrodes 10 each include a rear end segment (not shown) upon of which each forming electrode 10 is affixed in place transversely to the blade 2 on a first electrode support 12 that is positioned above the blade. The electrode support 12 is mounted in a vertically translatable manner on a post 14 of the apparatus of the invention so as to simultaneously displace forming electrodes 10 during the machining operation.

FIG. 2 shows that the forming electrode 10 includes an end segment 24 exhibiting a truncated tip element 26. In order to attain a particular geometry of the flared exhaust orifice 8, the end segment 24 comprises three beveled facets 24b, 24c and 24d. Only facets 24b and 24c are visible in FIG. 2.

A V-shaped groove 22, configured to receive part of an electrode of the second type, is longitudinally fitted into a side 28a of the middle segment 28 of each forming element 10 and into a side 24a of its front end segment 24. Preferably, the two sides 24a and 28a are situated in the same plane.

Figure 3:
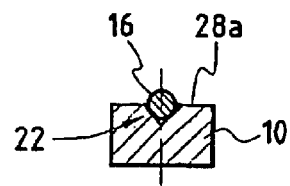
FIG. 3 is a cross-sectional view of the electrodes along line III—III of FIGS. 2 and 5.

FIG. 3 shows the straight electrode 16 inserted into the V-shaped groove 22. The geometry of the groove 22 may be modified according to a desired shape of the air duct 6.

Preferably, the second-type of electrodes have a cylindrical shape and are mounted on a second electrode support 18 that is vertically translatable on the post 14, as illustrated in FIG. 1.

According to the present invention, the second electrode support 18 is positioned above the first electrode support 12, and the cylindrical electrodes 16 are arranged to slide in the groove 22 of the associated forming electrodes 10 to define electrode pairs 10, 16.

The configuration of the two electrode supports 18 and 12 is such that a substantial distance is maintained between the cylindrical electrodes 16 and the blade 2 to be machined. To minimize the danger of warping during machining, a plate 20 is affixed to the post 14 to assure accurate guidance of the cylindrical electrodes 16 in the grooves 22 in the vicinity of the machining region. The plate 20 is configured opposite the grooves 22, maintaining the cylindrical electrodes 16 in their grooves 22 and guiding them in a machining operation.

The two electrode supports 12 and 18 permit adjustment of each forming electrode 10 and each cylindrical electrode 16 independently of each other, and as a result, a series of substantially aligned air ducts 6 may be machined simultaneously into a given blade 2.

As machining begins, the free end of the cylindrical electrode 16 is retracted into the front end segment 24 of the forming electrode and the two electrode supports 12 and 18 are lowered until the forming electrode 10 has finished machining the flared exhaust orifice 8, as shown in FIG. 2.

Figure 4:
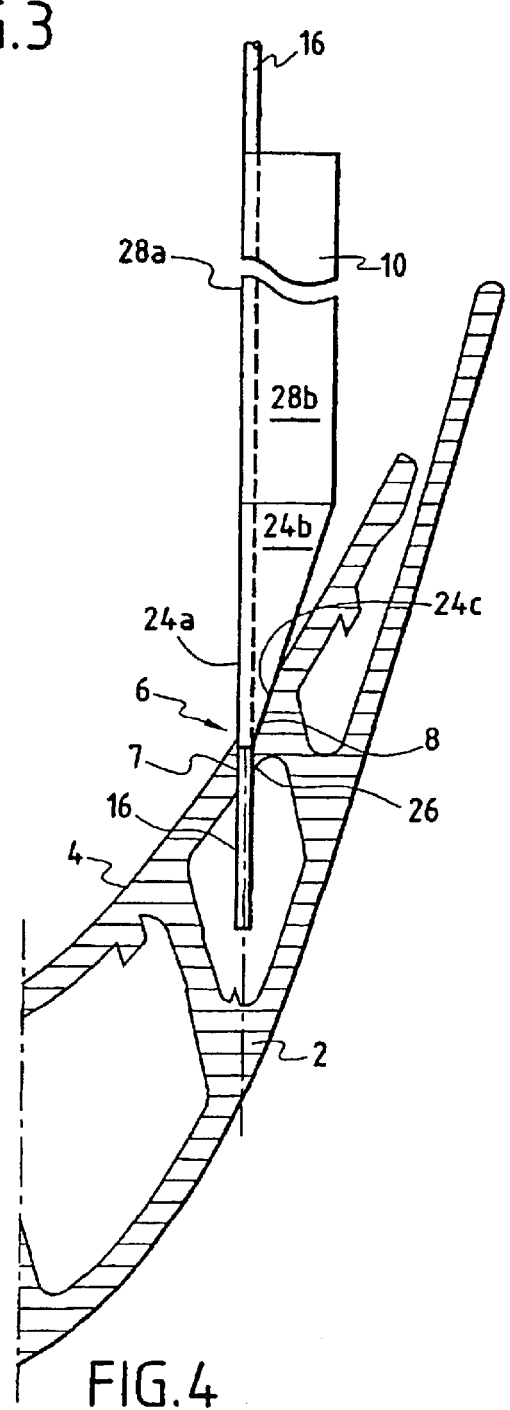
FIG. 4 is a sectional view of the blade of FIG. 2 when the machining of the cooling-air duct has been completed.

FIG. 4 illustrates that as soon as the machining of the flared exhaust orifice 8 has been terminated, only the electrode support 18 is lowered, while the forming electrode 10 is maintained in place in the exhaust orifice 8 so that the cylindrical electrode 16 can machine the cylindrical part 7 of the air duct 6.

Figure 5:
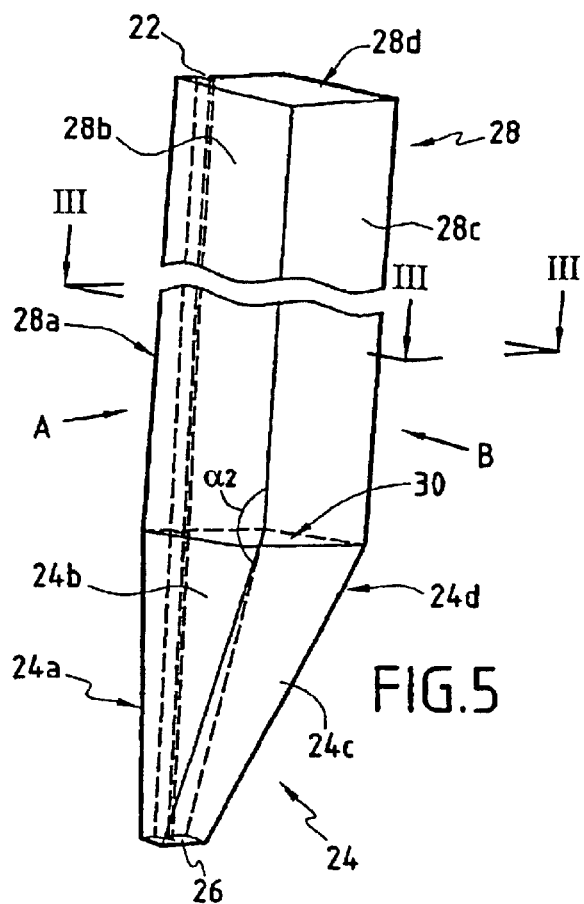
FIG. 5 is a perspective of the forming electrode.

The forming electrode 10 is constituted from a bar having a constant, rectangular cross-section with one beveled end. As shown in FIG. 5, the middle segment 28 comprises four sides 28a, 28b, 28c, and 28d. The side 28a is fitted with the V groove 22 which runs over the full length of the forming electrode 10.

Figure 6:
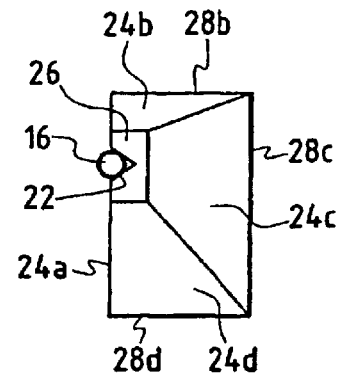
FIG. 6 is a bottom view of the forming electrode when the cylindrical electrode is in place.
Figure 5B:
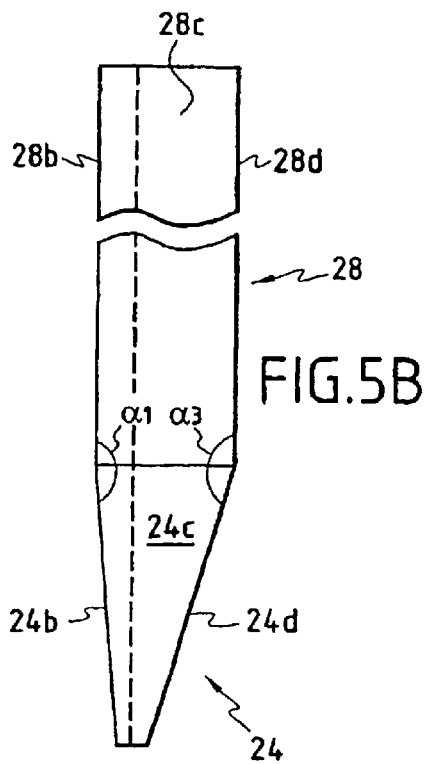
FIG. 5b is a view of FIG. 5 along B.
Figure 5A:
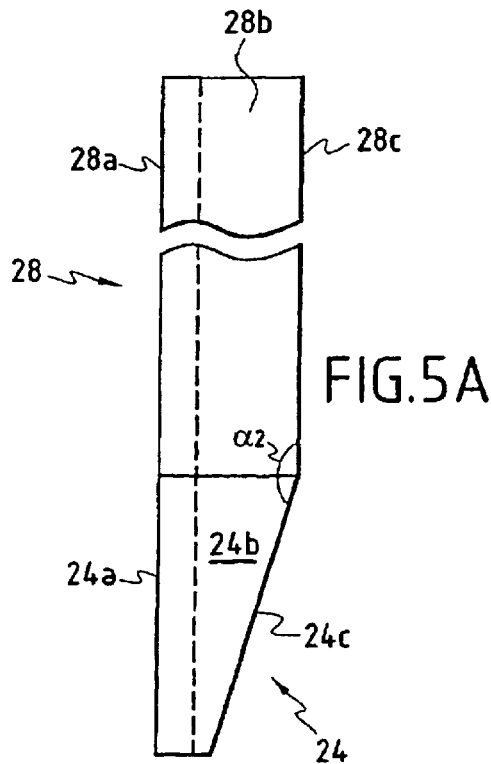
FIG. 5a is a view of FIG. 5 along A.

FIGS. 5a, 5b and 6 show a particular embodiment of the forming electrode 10. The end segment 24 comprises four facets 24a, 24b, 24c, 24d which are linked to the four sides 28a, 28b, 28c, 28d, respectively. The groove 22 runs in the facet 24a along the tip cross-section 26.

The facets 24b, 24c, 24d subtend angles $\alpha_1$, $\alpha_2$, $\alpha_3$, respectively with the sides 28b, 28c, 28d. In this manner, the slope of the facets 24a, 24b, 24c, 24d defines a front end segment having a cross-section that varies between the tip 26 and the middle segment 30.

FIG. 6 shows the forming electrode 10 and the cylindrical electrode 16 arranged in the groove 22. Depending on the values of the different angles $\alpha_1$, $\alpha_2$, $\alpha_3$, a differently shaped exhaust orifice 8 may be machined. In this invention, the angle $\alpha_1$ is preferably smaller than the angle $\alpha_3$, whereby the exhaust orifice 8 is non-symmetrical.

I claim:

1. An electrical discharge apparatus arranged to machine at least one straight cooling air duct having a flared exhaust orifice defined along the wall of a gas turbine engine's hollow blade, the apparatus comprising at least one forming electrode positioned on a first electrode support and configured to machine the flared exhaust orifice, further comprising a displacement device arranged to displace said first electrode support, said forming electrode including a rear end segment arranged to be affixed to the first electrode support, wherein said forming electrode includes a first side defining a groove configured to guide a straight electrode configured to machine a straight zone of said air duct, and further including a cross-sectionally constant middle segment and a pointed front end segment having a cross-section that decreases between said middle segment and the tip of the forming electrode.

2. The apparatus as claimed in claim 1, wherein the front end segment comprises three beveled facets.

3. The apparatus as claimed in claim 1, wherein the middle segment of the forming electrode defines a quadrangular cross-section.

4. The apparatus as claimed in claim 1, wherein the forming electrode is made from a cross-sectionally rectangular bar.

5. The apparatus as claimed in claim 1, wherein the groove has a v-shaped cross-section.

6. The apparatus as claimed in claim 1, further comprising a second electrode support on which is affixed at least one straight electrode arranged to slide in the groove.

7. The apparatus as claimed in claim 6, wherein the straight electrode is cylindrical.

8. The apparatus as claimed in claim 6, further comprising a plate configured to retain said cylindrical electrode in the groove.

9. The apparatus as claimed in claim 6, further comprising a means for simultaneously displacing the first electrode support and the second electrode support.

10. The apparatus as claimed in claim 6, further comprising a means for displacing the first electrode support and the second electrode support independently from each other.

11. The apparatus as claimed in claim 6, wherein the first electrode support supports a plurality of forming electrodes and the second electrode support supports a plurality of straight electrodes.

\* \* \* \* \*